Figure 1:
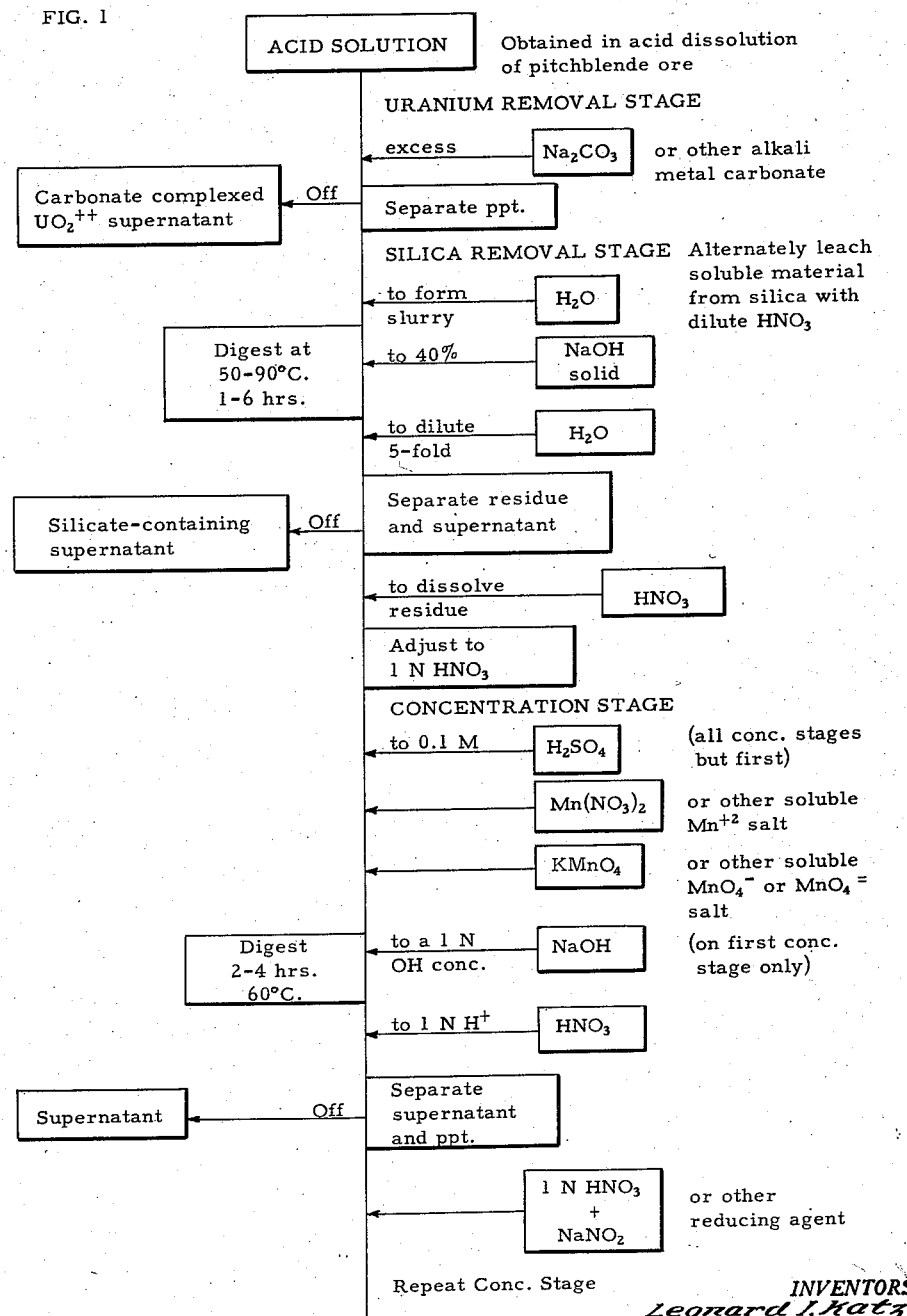

May 19, 1959     L. I. KATZIN ET AL     2,887,355

METHOD OF PREPARING PROTACTINIUM VALUES

Filed Sept. 20, 1948     3 Sheets-Sheet 1

May 19, 1959 L. I. KATZIN ET AL 2,887,355
METHOD OF PREPARING PROTACTINIUM VALUES
Filed Sept. 20, 1948 3 Sheets-Sheet 2

May 19, 1959     L. I. KATZIN ET AL     2,887,355

METHOD OF PREPARING PROTACTINIUM VALUES

Filed Sept. 20, 1948     3 Sheets—Sheet 3

INVENTORS:
Leonard I. Katzin
Raymond G. Larson
Roy C. Thompson
Quentin Van Winkle
By: Roland A. Anderson
Attorney

2,887,355
METHOD OF PREPARING PROTACTINIUM VALUES

Leonard I. Katzin, Chicago, Ill., Raymond G. Larson, Valparaiso, Ind., Roy C. Thompson, Austin, Tex., and Quentin Van Winkle, Columbus, Ohio, assignors to the United States of America as represented by the United States Atomic Energy Commission Application September 20, 1948, Serial No. 50,244

20 Claims. (Cl. 23—14.5)

This invention is concerned with a method of processing protactinium-containing ores to obtain the protactinium in a relatively pure state.

Protactinium occurs naturally only in uranium ores to the extend of about 0.25 part of protactinium per million parts of uranium, this value being fixed by the relative decay rates of $U^{235}$ and $Pa^{231}$. Substantially all of the protactinium which has been obtained in the past, probably considerably less than two grams, has been obtained by processing fractions of pitchblende ores which were by-products of the processing of these ores for radium. In the radium extraction process, the pitchblende ore is opened up and then treated with sulfuric acid and sodium nitrate, giving an acidic solution of uranyl salts (and other salts) and an insoluble residue which contains radium as the sulfate together with barium, calcium, lead, and most of the silicon. The insoluble sulfates are converted to the carbonates, usually by fusion, and then into bromides or chlorides. Several of the elements present are precipitated, and the radium is finally separated as the bromide by fractional crystallization from the residue. The ultimate residues following removal of the radium usually serve as the raw material for the separation of protactinium. The early methods of recovery of protactinium depended upon the treatment of these insoluble residues by precipitation, after dissolution, with tantalum as the cation of a carrier precipitate. This was based on the predicted close chemical similarity of protactinium and tantalum. The tantalum carrier technique, however, produced very poor results and a zirconium carrier, usually zirconium phosphate, was later used and produced much better results. Both procedures, however, have certain inherent difficulties. The starting material in both procedures is quite insoluble and large-scale alkali fusions are required to bring the materials into solution. A further disadvantage is that the protactinium content in the raw material is very low. An additional disadvantage is the tedious fractional crystallization and fractional sublimation procedures required for the final purification.

It is an object of this invention to provide a novel method of processing uranium ores to obtain protactinium in a relatively pure state.

It is an additional object of this invention to provide a method of processing a soluble fraction of pitchblende ore to obtain protactinium in a relatively pure state.

The inventors of this process discovered that the portion of pitchblende ore which dissolved in the initial acid treatment to obtain the radium, consisted primarily of uranium and silica with small fractions of other elements, including protactinium and that a larger amount of protactinium was present in the supernatant solution than in the residue. The process of this invention comprises the treatment of this acid solution to obtain protactinium in a relatively pure form.

Broadly, this process comprises the treatment of this supernatant acid solution with an alkali metal carbonate, whereby a mixed carbonate-hydroxide precipitate is formed which contains protactinium. This carbonate precipitate which contains a large amount of silica is separated from the solution and then treated to remove the major portion of the silica. The preferred method consists of treating the precipitate with a strong alkali hydroxide solution, whereby the silica is converted to the soluble silicate, and separating the insoluble residue containing the protactinium from the soluble silicate solution. The protactinium-containing residue is then dissolved in nitric acid and the protactinium is concentrated and separated from impurities not carried with manganese dioxide, by repeated cyclic precipitations with manganese dioxide in which each successive manganese dioxide carrier precipitate is reduced by approximately a factor of ten. Three such manganese dioxide precipitation stages usually give the most efficient concentration. Following the third precipitation stage, the protactinium contained in the solution of the last manganese dioxide carrier precipitate is hydrolyzed and thus precipitated. The precipitate contains substantially all of the protactinium, with titanium and zirconium (probably as the hydrous oxides) as the main impurities. This precipitate is freed from the last traces of silica, preferably by dissolving it in hydrofluoric acid and fuming to dryness in perchloric acid. The presence of titanium and zirconium does not interfere with the use of protactinium for certain purposes so that the purification process may be terminated at this point. If, however, the protactinium is desired substantially free of all impurities, the residue is then dissolved in hydrofluoric acid, and the protactinium is separated from the bulk of the remaining impurities by adsorption on an anion exchange adsorbent in the form of a protactinium fluoride complex ion. This ion is then eluted from the adsorbent with nitric acid, the fluoride complex is decomposed, and the final purification is achieved by the extraction of the protactinium into an organic solvent from an aqueous acidic solution. The protactinium is then re-extracted from the organic solvent into an aqueous solution with much lower acidity and the pure protactinium is precipitated as the peroxide.

In the preferred embodiment, the supernatant acid solution which is a by-product of the first operation in the processing of pitchblende ore for radium is treated with an excess of an alkali carbonate. The purpose of this step is to separate the uranium and other impurities which form a soluble carbonate in a solution containing excess carbonate ion from the protactinium which forms an insoluble carbonate or hydroxide under these conditions. Following the treatment with the excess carbonate the precipitate is separated from the supernatant solution which contains the uranyl carbonate complex ions. This supernatant solution may be processed for the recovery of the uranium contained therein.

The mixed carbonate-hydroxide precipitate remaining after separation of the carbonate-complexed uranyl solution contains a considerable fraction of silica and the next step of this process concerns the removal of the major part of this silica. The preferred method comprises treating the precipitate with a strong alkali hydroxide solution. This may be done by forming a slurry of the carbonate residue and making the slurry about 40% in sodium hydroxide by introducing solid sodium hydroxide into the slurry. The heat of dissolving the sodium hydroxide will maintain the temperature of the solution at between 50° and 90° C. and the slurry should be digested at a temperature within this range for from one to six hours. It is believed that the sodium hydroxide converts the silica present into the soluble hydrated silicate ion which dissolves in the solution. Excessive stirring is to be avoided since this results in a prolonged settling time for the metathesized residue. After digestion, the slurry is diluted with water about five fold and the residue permitted to settle. The residue is then separated from the supernatant solution and washed with water. The residue is dissolved in nitric acid and the acidity adjusted to about 1 N. The residue is sufficiently free of silica that a gel will form in the solution only if the acidity of the solution is raised above 5 N. An alternate procedure to free the protactinium-containing residue from soluble material, comprises the leaching of the silica from the carbonate precipitate by repeated treatments with nitric acid leaving the insoluble silica.

Following the dissolution of the carbonate residue by the preferred process set forth above, or by the alternate method of leaching the carbonate residue, the protactinium is concentrated by manganese dioxide carrier precipitation cycles. The usual method of carrying protactinium with manganese dioxide comprises introducing a soluble manganous salt and a soluble manganate or permanganate, usually potassium permanganate, into the acid solution containing protactinium, thus forming a manganese dioxide precipitate which carries the protactinium by absorption. It was found, however, that while this method is efficient in the carrying of protactinium from a solution containing tracer amounts of protactinium and very small amounts of contaminants, it yields erratic carrying or no carrying at all to (50–60% as a maximum) where the protactinium is present in macro-amounts and is contaminated with the other elements usually found in the solution at this stage of the process. It was discovered that this erratic carrying might be avoided and the efficiency of the carrying increased to about 75–90% by precipitating the protactinium (along with the other alkali-hydroxide-insoluble materials present) as the hydroxide, followed by re-acidifying and separating the protactinium with the manganese dioxide carrier precipitate.

The method of carrying out this improved manganese dioxide cycle comprises introducing a soluble manganous salt, preferably manganous nitrate, into the dilute nitric acid solution containing protactinium and then introducing a soluble manganate or permanganate salt, preferably potassium permanganate, to form a manganese dioxide precipitate. A manganese dioxide precipitate between 1 and 10% by weight and preferably about 2% by weight of the original carbonate residue gives entirely satisfactory carrying. Solid sodium hydroxide is then added to the manganese dioxide slurry and the slurry agitated for several hours. The heat of solution of the sodium hydroxide maintains the temperature of the mixture in excess of 60° C. during this period. The formation of a colloidal manganese dioxide precipitate is avoided by maintaining the temperature of the solution at higher than room temperature and preferably above 50° C. After digestion for from two to four hours at a hydroxide ion concentration of about 1 N, the hydroxides are redissolved by acidifying the slurry with nitric acid to about a 1 N acidity. The heat evolved during neutralization aids in the flocculation of the manganese dioxide. The manganese dioxide precipitate is then separated by decantation, although centrifugation or filtration are equally satisfactory methods of separation.

The manganese dioxide protactinium carrier precipitate is dissolved by reducing the manganese ion to the manganous state in an acid solution. The manganese dioxide precipitate is introduced into a nitric acid solution in which the acid concentration is greater than 0.75 N, and preferably about 1 N, and which contains a stoichiometric amount of a soluble reducing agent, preferably sodium nitrate.

The steps of manganese dioxide precipitation, precipitate separation, and dissolution of the manganese dioxide precipitate form a concentration stage. The concentration of the protactinium is effected by reducing the amount of the manganese dioxide precipitate formed in each successive stage, and three stages are usually sufficient to give the most effective concentration of the protactinium. The protactinium is carried by adsorption, so that the manganese dioxide precipitate may be decreased by as much as 90% in successive precipitations without decreasing the amount of protactinium carried. The sodium hydroxide metathesis treatment is only required in the first stage and need not be reepated in the subsequent precipitation stages. However, it has been found desirable in the second and third stages to add sulfuric acid to a concentration of about 0.1 M prior to the formation of the manganese dioxide carrier precipitate to prevent the formation of a colloidal manganese dioxide precipitate. The sulfuric acid not only avoids the formation of a colloidal manganese dioxide precipitate but also results in the formation of a white residue which is insoluble in the solution. This white residue consists partially of insoluble sulfates. Spectrographic analysis has shown that the principal cations in this insoluble residue are calcium and silicon with iron, manganese, sodium, barium, tin titanium, and vanadium also being present in significant amounts. The residue is not dissolved with the manganese dioxide precipitate and therefore these impurities can be separated from the solution of the protactinium-containing manganese dioxide at this point.

The third manganese dioxide protactinium-containing precipitate is dissolved in the acidic reducing solution usually about 1 N in nitric acid. The protactinium is then precipitated from this solution by hydrolysis. This may be accomplished by permitting the solution to stand at room temperature for several days. Protactinium is probably the most readily hydrolyzable of the elements, and this characteristic may be utilized to effect a partial separation of the protactinium from less readily hydrolyzable impurities present in the solution. In the preferred method, the acidity of the solution is increased to, for example, from 3 to 7 N, and preferably about 5 N, and the solution heated to an elevated temperature, preferably between 50 and 100° C. The precipitate formed contains the protactinium practically quantitatively, but the less readily hydrolyzable elements remain in the solution.

The protactinium-containing precipitate is then separated from the solution. It may then be freed from substantially all the remaining silica by dissolving in hydrofluoric acid and then fuming to dryness in perchloric acid. This is not a necessary part of the process, but it is desirable if further treatment by adsorption or solvent extraction is to be carried out. The residue consists primarily of protactinium, titanium, and zirconium and is free from practically all other contaminants which were originally present.

Two properties of protactinium are employed principally in effecting its separation from the titanium and zirconium. These are: (1) its ability to form a stable complex anion with the fluoride ion, which is readily adsorbed by an anion exchange adsorbent, and (2) its extractibility into an organic solvent from strong nitric or hydrochloric acid solutions. The residue remaining after fuming is dissolved in hydrofluoric acid and may be treated at once by the adsorption method, or a preliminary step to reduce the amount of titanium may be introduced at this point. The alternative preliminary step comprises suspending the residue in a small volume of 10 N nitric acid and then slowly adding an approximately equal volume of 30% hydrogen peroxide with warming and stirring, whereupon part of the residue dissolves. The material insoluble upon such treatment retains the protactinium nearly quantitatively. The residue is then treated with the concentrated hydrofluoric acid, thus dissolving substantially all of the protactinium and much of the titanium. The supernatant hydrofluoric acid solution is then separated from the residue and diluted to an approximately 4 N hydrofluoric acid concentration with water.

The solution obtained above by the preferred procedure or the solution obtained by this alternative step contains the protactinium as the stable protactinium fluoride complex, and this complex is then separated from the solution by adsorption on an anion exchange adsorbent, such as the heavy-metal silicates or the synthetic resinous adsorbents. The resin which has been found preferable comprises a condensation product of a polyalkylene polyamine with formaldehyde and phenol prepared as set forth in U.S. Patent 2,402,384 and known commercially as "Amberlite IR-4." The "Amberlite IR-4" may be used to adsorb protactinium complex either by the batch method or in an adsorption column. The acidity of the hydrofluoric acid solution should be between about 0.05 and 5 N.

Following the adsorption of the protactinium fluoride complex, it is eluted from the resin by treatment with a dilute nitric acid solution between about 0.5 and 3 N and preferably about 1 N in nitric acid. Several elutions are commonly carried out to completely remove the protactinium from the adsorbent. The first eluate commonly contains about 90% of the protactinium with only a few percent of the titanium, whereas the second eluate may contain as much as 50% of the titanium together with the remaining 10% of the protactinium. This second eluate is usually combined with the following batch and recycled through the adsorbent. The eluate containing the protactinium and titanium is then neutralized with an alkali hydroxide, preferably sodium hydroxide, whereupon the protactinium and titanium precipitate as the hydroxides. These hydroxides are separated from the supernatent by centrifugation and washed with water to remove the last traces of fluoride ion. The precipitates are then dissolved in nitric acid. The titanium has a strong tendency under these circumstances to form a colloidal precipitate which is unsuitable for the solvent extraction step which follows. The addition of hydrogen peroxide to the solution to a concentration of about 0.1 to 0.9% and preferably about 0.3%, however, converts the titanium to the titanium peroxide complex ion and in this form the titanium is effectively separated from the protactinium by solvent extraction.

The protactinium is extracted from an aqueous acidic solution, preferably nitric or hydrochloric acid, into an organic solvent. There are many organic solvents which may be used, but the most efficient solvents have been found to be amyl acetate and the aliphatic ketones having six and seven carbon atoms, such as diisopropyl and methyl isobutyl ketone. The preferred solvent is diisopropyl ketone. In the absence of peroxide and using equal volumes of aqueous and ketone phases, at least 65% of the protactinium extracts into the ketone phase from solutions 4 to 6 N in hydrogen ion concentration. Alkaline earth nitrates, such as calcium and magnesium nitrate, can be used as salting-out agents, but these may result in the formation of colloidal solutions from which the protactinium cannot be readily extracted. It has therefore been found preferable to use a higher concentration of nitric acid as the salting agent in the presence of about 0.3% peroxide solution. Under these conditions and at 4.5 N acidity, the extraction was only 3%, but at 6.7 to 10 N, the extraction was considerably better than 65%. The preferred range of acidity under these conditions is therefore between 6 and 10 N.

Several solvent extraction cycles are usually carried out to free the protactinium of all impurities. The method of the final purification of the protactinium by solvent extraction is set forth in greater detail in U.S. patent application S.N. 26,724, filed May 12, 1948.

Figure 1A:
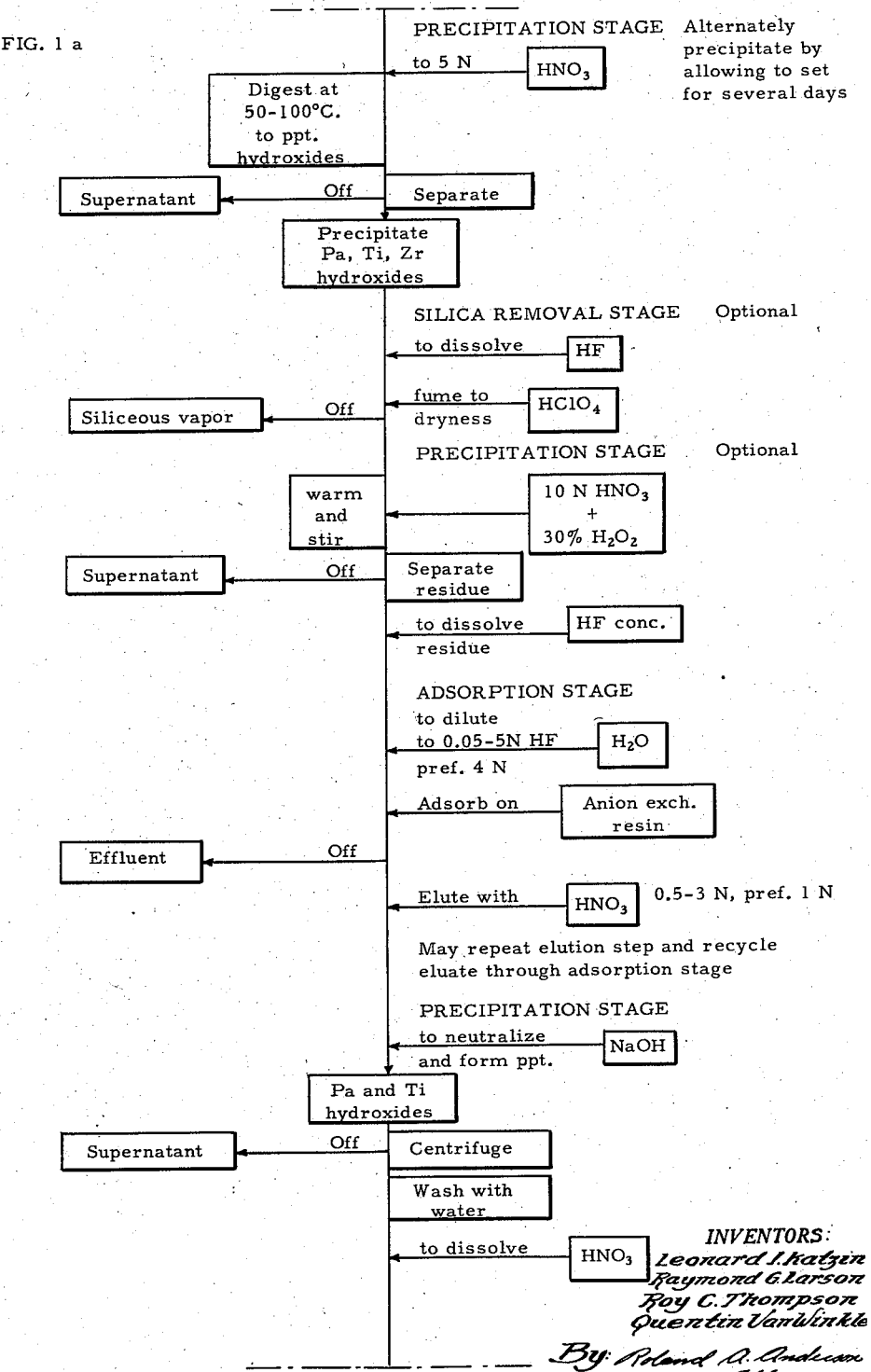
Figure 1B:
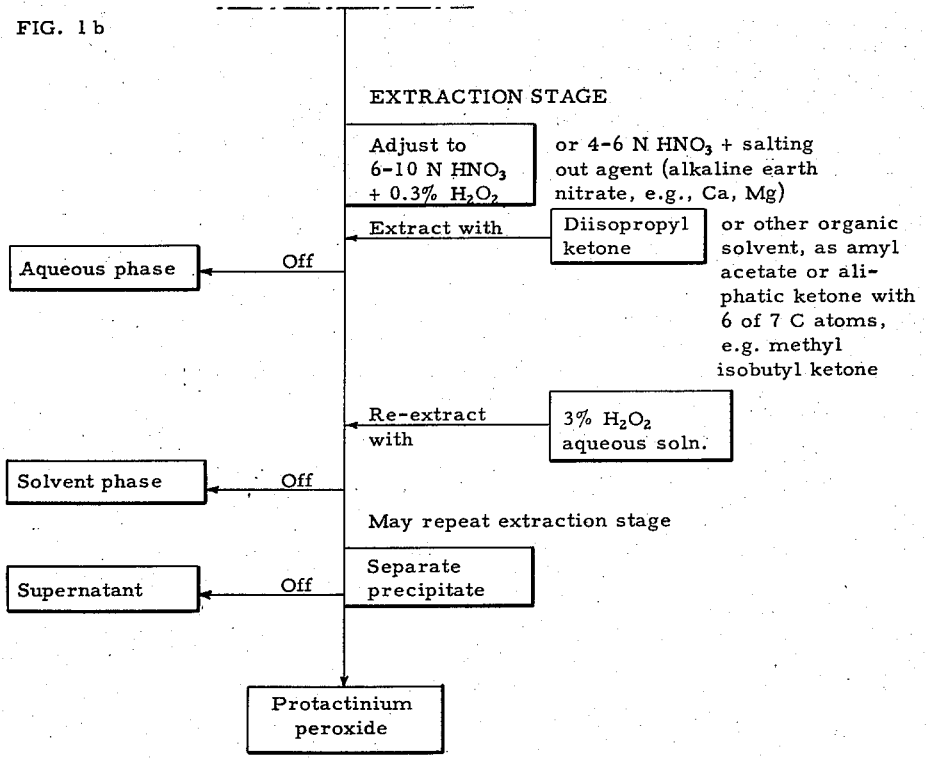

Fig. 1, Fig. 1a, Fig. 1b are flow sheets illustrating the process of this invention.

The process of the present invention may be best illustrated by the following example in which a preferred embodiment is set forth.

*Example*

A sample of pitchblende ore was opened up and treated with sulfuric acid and sodium nitrate according to the method customarily used in treating such ore in the processing of pitchblende for radium. The supernatant sulfuric acid solution was then separated from the residue and treated with an excess of sodium carbonate whereby a carbonate precipitate was formed that contained protactinium in an amount of about 0.2 p.p.m. Ten kg. of this carbonate residue was slurried with 20.1 of water and the slurry made 40% in sodium hydroxide by introducing solid sodium hydroxide into the slurry. The heat of solution of the sodium hydroxide raised the temperature of the slurry to about 80° C. and maintained the temperature of the slurry above 60° C. during the digestion period. The thick slurry was stirred intermittently for short periods and digested for four hours at about 60° C. The slurry was then diluted to about 100 l. with water and the residue was allowed to settle. The supernatant solution was decanted and the residue washed once with water by decantation. The residue was then substantially dissolved in nitric acid which was diluted to form a 1 N nitric acid solution of about 50 l.

Manganese nitrate and potassium permanganate were then introduced into this solution whereby a manganese dioxide precipitate was formed. Solid sodium hydroxide was added to this slurry to make it about 1 M in sodium hydroxide. The heat of dissolution of the sodium hydroxide raised the temperature of the slurry to about 80° C. The slurry was digested for four hours at a temperature not less than 60° C. At the end of this time the hydroxide solution was neutralized by adding concentrated nitric acid to obtain a nitric acid concentration of 1 N. The magnanese dioxide precipitate was then separated by decantation and dissolved by introducing it into a 1 N nitric acid solution containing a slightly greater than stoichiometric amount of sodium nitrite.

Potassium permanganate was then introduced into this solution in a quantity to form a manganese dioxide precipitate one-tenth as much as that precipitated in the preceding step. Sulfuric acid was added to the solution in a volume sufficient to give a concentration of 0.1 M in sulfuric acid. This resulted in the formation of a small white precipitate. The manganese dioxide and sulfate precipitates were then separated and the manganese dioxide precipitate was dissolved as described above. The sulfate precipitate was insoluble under these conditions and was separated from the manganese-containing solution.

A third manganese dioxide carrier precipitation stage was then carried out substantially the same as the second carrier precipitation whereby one-tenth as much manganese dioxide was precipitated as in the preceding precipitation step.

The solution obtained by dissolution of the third manganese dioxide protactinium-containing precipitate was made 5 N in nitric acid and heated in a boiling water bath until a precipitate was formed. This precipitate was separated from the solution by centrifugation, dissolved in concentrated hydrofluoric acid, and fumed to dryness with perchloric acid. The residue, which contained substantially all of the protactinium, was suspended in a small volume of 10 N nitric acid and approximately an equal volume of 30% hydrogen peroxide was added while the mixture was heated and stirred. The material insoluble upon such treatment, primarily titanium and zirconium, retained the protactinium nearly quantitatively. This residue was separated from the solution and dissolved in concentrated hydrofluoric acid, which was later diluted to about 4 N forming a 2.5-liter volume.

The solution was then passed through a column containing a bed of "Amberlite IR-4" 30 cm. in diameter and 35 cm. deep at a rate of one liter/hr. The column was then rinsed with 700 ml. of water and 500 ml. of 0.1 N nitric acid with no loss of protactinium. Protactinium was eluted from the column with a 1 N nitric acid eluant. Two elutions were carried out the first of which removed 90% of the protactinium from the column with only a few percent of the titanium and the second of which removed 10% of the protactinium with about 50% of the titanium. The second eluate was recycled with the succeeding batch. The first eluate comprised about one liter of 1 N nitric acid and contained about 10 mg. of protactinium and 140 mg. of titanium. This solution was neutralized with sodium hydroxide, thus resulting in a precipitation of the protactinium and titanium as the hydroxides. These hydroxides were separated by centrifugation and washed twice with water to remove the last traces of fluoride ion. The hydroxide precipitate was dissolved in 100 ml. of 3 N nitric acid. The protactinium was then separated from the titanium and other impurities present by a solvent extraction procedure.

A set of five 250-ml. centrifuge bottles was used for the solvent extraction. The protactinium-containing solution was made 7 N in nitric acid and placed in bottle No. 1. Bottles Nos. 2 and 3 contained 75 ml. of 0.3% hydrogen peroxide in water. Bottles Nos. 4 and 5 contained 75 ml. of 3% peroxide in water. The solution in bottle No. 1 was equilibrated with successive portions of diisopropyl ketone that had been pre-equilibrated with a 7 N nitric acid aqueous solution to prevent extraction of nitric acid from bottle No. 1. The equilibration was accomplished with vigorous mechanical stirring for between two and three minutes. Each portion of ketone after removal from bottle No. 1 was equilibrated successively against the solutions in bottles Nos. 2, 3, 4, and 5. Nitric acid and impurities were removed from the ketone by the aqueous layers of bottles 2 and 3. Then, with the acid concentration in the ketone reduced to a low value, equilibration against 3% peroxide in bottle No. 4 resulted in an essentially quantitative removal of the protactinium from the ketone layer and its precipitation as the white peroxide. When nitric acid had accumulated in bottle No. 4 to such an extent that an appreciable amount of protactinium was observed to be passing over into bottle No. 5, bottle No. 4 was removed and replaced in the system by bottle No. 5 which in turn was replaced by a fresh solution of 3% hydrogen peroxide. Nitric acid accumulated in bottles Nos. 2 and 3 and these solutions were replaced by fresh solutions after equilibration with several portions of ketone.

The peroxide slurries from the No. 4 bottles were approximately 1 N in nitric acid. They occupied a combined volume of about 250 ml. and the solubility of the protactinium peroxide was about 1 mg./liter. The peroxide precipitate was separated by centrifugation, washed with 0.1 N nitric acid-3% hydrogen peroxide solution, and dissolved in 50 ml. of 8 N nitric acid by heating for forty-five minutes at 100° C. A spectrographic analysis on a portion of this slightly turbid solution showed the following impurities: Zr, 0.75%; Si, 0.75%; Ca, 0.25%; and Mg, 0.05%.

After standing for several days a solid phase separated from the 8 N nitric acid solution. The solubility was ca. 0.3 mg. protactinium per milliliter. This precipitate was redissolved in additional acid and the entire batch repurified by another diisopropyl ketone extraction. The impurities mentioned above were completely eliminated by this treatment. A total of slightly more than 20 mg. of pure protactinium was obtained by this procedure.

While there have been described certain embodiments of our invention, it is to be understood that it is capable of many modifications. Changes, therefore, may be made without departing from the spirit and scope of the invention as described in the appended claims, in which it is the intention to claim all novelty in the invention as broadly as possible.

What is claimed is:

1. The method of recovering protactinium in a pure state, from the carbonate residue which is a by-product in the processing of uranium ore, which comprises freeing said residue from the bulk of the silica contained therein, dissolving said silica-free residue in an acid solution, carrying the protactinium from said solution on a manganese dioxide precipitate, dissolving said precipitate, hydrolyzing the protactinium contained in the solution whereby a protactinium-containing precipitate is formed, separating the protactinium-containing precipitate from said solution, dissolving said precipitate and converting the protactinium contained therein to the protactinium fluoride complex ion by treatment with hydrofluoric acid, adsorbing said protactinium complex ion on an anion exchange adsorbent, eluting said protactinium complex ion from the adsorbent, decomposing the protactinium fluoride complex freeing the protactinium from fluoride ions, and separating said protactinium from the remaining impurities by extracting the protactinium into an organic solvent.

2. The process of claim 1 wherein the carbonate residue is freed from silica by leaching the soluble material from the silica with a nitric acid solution.

3. The process of claim 1 wherein the carbonate residue is freed from silica by treating the residue with a strong alkali hydroxide solution whereby the silica is converted to a soluble silicate and the insoluble residue then separated from the silicate-containing solution.

4. The process of obtaining relatively pure protactinium from a protactinium-containing ore, which comprises treating the ore with a sulfuric acid-alkali nitrate solution, separating the supernatant solution from the residue and precipitate thus formed, treating said supernatant solution with an excess of an alkali metal carbonate, separating the insoluble precipitate thus formed from the solution, treating said precipitate with a strong alkali hydroxide solution whereby the silica is converted to a soluble silicate, separating the insoluble residue from the soluble silicate, dissolving said residue in an acid solution, carrying the protactinium from said solution on a manganese dioxide precipitate, dissolving said precipitate, hydrolyzing the protactinium contained in the solution whereby a protactinium-containing precipitate is formed, separating said precipitate from the solution, and converting the protactinium contained therein to the protactinium fluoride complex ion by treatment with hydrofluoric acid, adsorbing said protactinium complex ion on an anion exchange adsorbent, eluting said protactinium complex ion from the adsorbent, decomposing the protactinium fluoride complex freeing the protactinium from fluoride ions, and separating said protactinium from the remaining impurites by extracting the protactinium into an organic solvent.

5. The process of claim 4 wherein the protactinium-containing ore is pitchblende.

6. The process of claim 4 wherein the anion exchange adsorbent is a synthetic resin.

7. The process of claim 6 wherein the synthetic resin is a condensation product of a polyalkylene polyamine with formaldehyde and phenol.

8. The process of claim 4 wherein the organic solvent is an aliphatic ketone having not less than six and not more than seven carbon atoms.

9. The process of claim 8 wherein the ketone is diisopropyl ketone.

10. The process of claim 8 wherein the ketone is methyl isobutyl ketone.

11. The process of obtaining relatively pure protactinium from a protactinium-containing ore, which comprises treating the ore with a sulfuric acid-alkali nitrate solution, separating the supernatant solution from the residue and precipitate thus formed, treating said supernatant solution with an excess of an alkali metal carbonate, separating the insoluble precipitate thus formed, treating said precipitate with a strong alkali hydroxide solution whereby the silica present is converted to a soluble silicate, separating the insoluble residue from the soluble silicate, dissolving said residue in an acid solution, concentrating the protactinium contained therein by carrying out repeated manganese dioxide carrier precipitation stages, each stage comprising carrying protactinium from the solution with a carrier of manganese dioxide and dissolving said manganese dioxide precipitate in an acid solution containing a reducing agent capable of reducing the tetravalent manganese ion to the divalent state, hydrolyzing the protactinium contained in the solution formed by dissolving the final manganese dioxide precipitate whereby the protactinium is precipitated from the solution, separating said precipitate from the solution, dissolving said precipitate and converting the protactinium contained therein to the protactinium fluoride complex ion by treatment with hydrofluoric acid, adsorbing said protactinium complex ion on an anion exchange adsorbent, eluting said protactinium complex ion from the adsorbent, decomposing the protactinium fluoride complex freeing the protactinium from the fluoride ions, and separating said protactinium from the remaining impurities by extracting the protactinium into an organic solvent.

12. The process of obtaining protactinium in a relatively pure state from protactinium-containing ore, which comprises treating said ore with a sulfuric acid-alkali metal nitrate solution, separating the supernatant solution from the residue and precipitate thus formed, treating said supernatant solution with an alkali metal carbonate in excess of that required to convert the uranyl ions present to a soluble uranyl carbonate complex, separating the mixed carbonate-hydroxide protactinium carrier precipitate thus formed from the solution, treating said carbonate-hydroxide precipitate with a strong alkali hydroxide solution, whereby the silica present is converted to a soluble form, separating the insoluble residue containing the protactinium from the supernatant solution, dissolving said residue in nitric acid, treating said acid solution with a manganese dioxide precipitate whereby the protactinium is carried from solution, dissolving said protactinium carrier precipitate in a nitric acid solution containing a reducing agent capable of reducing the tetravalent manganese ion to the divalent state, concentrating the protactinium by repeating the manganese dioxide carrier precipitation and dissolution a plurality of times reducing the volume of the manganese dioxide precipitate each time, hydrolyzing the protactinium contained in the solution of the final manganese dioxide precipitate whereby the protactinium is precipitated from the solution, separating said precipitate from the solution, dissolving said precipitate in hydrofluoric acid and then fuming to dryness, dissolving the residue in hydrofluoric acid, treating said acid solution having an acidity of between 0.05 and 5 N in hydrofluoric acid with an anion exchange resin capable of adsorbing protactinium contained in said solution in the form of the protactinium fluoride complex ion, eluting the protactinium complex from said resin with a dilute nitric acid solution, treating the protactinium fluoride complex ion with sodium hydroxide whereby the protactinium is precipitated as the hydroxide, washing the precipitate free of fluoride ions, dissolving the protactinium hydroxide in a nitric acid solution between 4 and 10 N in nitric acid, treating said solution with a soluble peroxide whereby any titanium ions present are converted to the titanium peroxide complex ions, extracting the protactinium from said nitric acid solution into a diisopropyl ketone in the presence of hydrogen peroxide and re-extracting protactinium from the ketone into an aqueous solution.

13. The process of obtaining protactinium in a relatively pure state from pitchblende, which comprises treating said pitchblende with a sulfuric acid-alkali metal nitrate solution, separating the supernatant solution from the residue and precipitate thus formed, treating said supernatant solution with sodium carbonate in excess of that required to convert the uranyl ions present to a soluble uranyl carbonate complex, separating the mixed carbonate-hydroxide protactinium carrier precipitate thus formed from the solution, treating said carbonate-hydroxide precipitate with 40% sodium hydroxide, whereby the silica present is converted to the silicate and dissolved, separating the insoluble residue containing the protactinium from the silicate-containing solution, dissolving said residue in nitric acid, introducing manganous nitrate and potassium permanganate in sufficient quantity to form a manganese dioxide precipitate approximately 2% of the mass of the original carbonate residue, adding sodium hydroxide to the slurry thus formed to about a 1 N hydroxide concentration, digesting the slurry for from two to four hours, acidifying the slurry with nitric acid to a concentration of about 1 N acidity, separating the manganese dioxide protactinium-containing precipitate, dissolving the precipitate in a nitric acid solution containing a stoichiometric amount of sodium nitrite, re-precipitating a manganese dioxide carrier precipitate approximately one-tenth the mass of the preceding manganese dioxide precipitate in the presence of 0.1 M sulfuric acid, separating and redissolving said precipitate, repeating the manganese dioxide concentration stage a third time in the same manner as the second manganese dioxide concentration stage, increasing the acidity of the solution obtained by dissolving the third manganese dioxide precipitate to approximately 5 N in nitric acid, and digesting the solution at approximately 100° C. until a protactinium-containing precipitate forms, separating said precipitate, dissolving said precipitate in concentrated hydrofluoric acid and fuming to dryness with perchloric acid, dissolving the residue in approximately 4 N hydrofluoric acid, and passing the solution thus formed through an anion exchange adsorption column containing a condensation product of a polyalkylene polyamine with formaldehyde and phenol, whereby the protactinium is adsorbed, eluting the protactinium from the adsorbent with 1 N nitric acid, alkalizing the eluate with sodium hydroxide, whereby a protactinium hydroxide precipitate is formed, separating said precipitate and washing it free of fluoride ions, dissolving said precipitate in nitric acid, and making said soluton 0.3% in hydrogen peroxide, increasing the acidity to 7 N in nitric acid, equilibrating the solution thus formed with an equal volume of diisopropyl ketone, whereby the protactinium is extracted into the ketone, equilibrating the ketone with an equal volume of a 3% peroxide solution, whereby the protactinium is precipitated as the protactinium peroxide, and separating the protactinium peroxide from the peroxide solution.

14. The improvement in the solvent extraction method of separating protactinium from titanium, which comprises treating the aqueous solution containing the titanium and protactinium with hydrogen peroxide, whereby the titanium is converted to the titanium peroxide complex, introducing nitric acid into the solution to an acidity between 4.5 and 10 N, and contacting the aqueous solution with diisopropyl ketone whereby the protactinium is extracted into the ketone.

15. The improvement in the solvent extraction method of separating protactinium from titanium, which comprises forming an aqueous solution, between 6.7 and 10 N in nitric acid, containing protactinium and titanium peroxide complex, and contacting said solution with an approximately equal volume of diisopropyl ketone whereby the protactinium is extracted into the ketone.

16. The improvement in the solvent extraction method of separating protactinium from titanium, which comprises forming an aqueous solution, between 7 and 9 N in nitric acid and approximately 0.3% in peroxide, containing protactinium and titanium, contacting said solution with an approximately equal volume of diisopropyl ketone, whereby the protactinium is extracted into the ketone, and extracting the protactinium from the ketone, by contacting the ketone with an approximately 3% peroxide aqueous solution, whereby the protactinium peroxide is precipitated in the aqueous phase.

17. The improvement in the carrying of protactinium from manganese dioxide, which comprises treating a solution containing protactinium with a soluble manganous salt and a soluble permanganate whereby a manganese dioxide precipitate is formed, alkalizing the slurry thus formed, and digesting said slurry at a temperature greater than 50° C., acidifying said slurry and separating the manganese dioxide protactinium carrier precipitate.

18. The improvement in the carrying of protactinium from manganese dioxide, which comprises treating a solution containing protactinium with a soluble manganous salt and a soluble permanganate whereby a manganese dioxide precipitate is formed, treating the slurry thus formed with sodium hydroxide to a hydroxide concentration of approximately 1 N, digesting said treated slurry at a temperature between 50 and 80° C., acidifying said slurry with nitric acid to a nitric acid concentration of approximately 1 N, and separating the manganese dioxide protactinium carrier precipitate.

19. The improvement in the carrying of protactinium with a manganese dioxide precipitate, which comprises contacting the manganese dioxide precipitate with the protactinium-containing solution, in the presence of about 0.1 M sulfuric acid.

20. The method of extracting protactinium from a protactinium-containing ore, which comprises treating said ore with a sulfuric acid solution containing nitrate ion, whereby an insoluble precipitate is formed, separating the supernatant solution from said precipitate, treating the supernatant solution with an excess of a soluble carbonate, separating the precipitate thus formed, and removing the major portion of silica contained therein by treating said precipitate with a strong alkali hydroxide solution, separating the insoluble residue from said solution, dissolving said residue in a nitric acid solution between 1 and 5 N in nitric acid, introducing a soluble manganous salt and a soluble permanganate salt into said solution whereby a manganese dioxide precipitate is formed, introducing a soluble alkali hydroxide into said solution to a hydroxide concentration of about 1 N, digesting the slurry thus formed, re-acidifying the slurry to about a 1 N acidity with nitric acid, separating the manganese dioxide precipitate by treating with a nitric acid solution containing a stoichiometric amount of sodium nitrite, repeating the manganese dioxide precipitation stage in the presence of about 0.1 M sulfuric acid between one and three times decreasing the amount of manganese dioxide precipitate by a factor of ten each precipitation, hydrolyzing the protactinium contained in the solution of the final manganese dioxide precipitate by increasing the acidity of said solution to about 5 N nitric acid, and digesting said solution at a temperature of about 100° C. until a protactinium-containing precipitate forms, and separating said protactinium-containing precipitate from the solution.

References Cited in the file of this patent
UNITED STATES PATENTS

| | | |
|---|---|---|
| 1,531,336 | Halvorsen et al. | Mar. 21, 1925 |
| 1,792,410 | Buchner | Feb. 10, 1931 |

OTHER REFERENCES

Thompson: "Studies on the Chemistry of Protactinium," declassified document AECD–1897, dated February 1948, declassified April 15, 1948. Technical Information Div., Oak Ridge, Tenn.